United States Patent [19]

Virr

[11] 4,148,186
[45] Apr. 10, 1979

[54] ENGINE

[75] Inventor: Michael J. Virr, Stourbridge, England

[73] Assignee: Stone-Platt Fluid Fire Limited, England

[21] Appl. No.: 815,842

[22] Filed: Jul. 14, 1977

[30] Foreign Application Priority Data

Jul. 17, 1976 [GB] United Kingdom ............... 29864/76

[51] Int. Cl.² .......................... F02C 3/26; F23D 19/00
[52] U.S. Cl. ............................... 60/39.35; 60/39.46 S; 431/7
[58] Field of Search ............. 60/39.34, 39.35, 39.46 S; 34/57 D; 110/28 H, 28 J; 431/7

[56] References Cited

U.S. PATENT DOCUMENTS

| 2,958,298 | 11/1960 | Mayers | 110/28 J |
| 4,039,272 | 8/1977 | Elliot | 431/7 |

Primary Examiner—Louis J. Casaregola
Attorney, Agent, or Firm—Holman & Stern

[57] ABSTRACT

A gas turbine engine has a rotatable drum within which a bed of articles is supported. A compressor of the engine feeds compressed air into the drum to fluidize the bed. Powdered coal is fed into the drum to burn in the bed and the hot products of combustion pass through cyclones to the power turbine. The drum has a solids outlet through which excess particles are discharged from the bed.

6 Claims, 3 Drawing Figures

ENGINE

BACKGROUND OF THE INVENTION

In a Paper entitled "Gas Turbine Key to solid waste disposal" by Bert Goldrath published by Ruston Gas Turbines Limited of Lincoln England, there is described a gas turbine which is driven by hot, gaseous products of combustion produced in a fluidised bed to which combustible solid material and air are supplied. The fluidised bed is contained in a cylindrical combustor 22 ft. high and 9½ ft. in diameter. The bed lies at the bottom of this cylinder and has a depth of 2 ft. The size of the fluidised bed combustor renders this equipment unsuitable for many applications.

SUMMARY OF THE INVENTION

It is an object of the invention to provide a gas turbine engine comprising a fluidised bed combustor which is sufficiently compact to enable the engine to be used in a skid or trailer mounted electric power generating plant.

According to the invention, there is provided an engine comprising a turbine in a power duct; a drum having a circumferentially extending wall which is permeable to gases, a gas outlet remote from the circumferentially extending wall and communicating with the power duct, and a solids outlet adjacent to the circumferentially extending wall; a casing in which the drum is contained; means for supporting the drum for rotation relative to the casing; a bed of particles which is supported in the drum at least during operation of the engine; means for feeding air into the drum through the circumferentially extending wall to fluidise the bed of particles; and means for delivering a fuel into the drum; whereby fuel burns in the bed of particles, the hot products of combustion pass through the gas outlet to the power duct to drive the turbine and excess particles are discharged from the bed through the solids outlet.

Because combustion takes place in a fluidised bed which is supported within a rotating drum, the velocity of the fluidising air can be a plurality of times greater than the maximum fluidising velocity which can be attained in a stationary fluidised bed. Accordingly, the rate of heat release by combustion can be much higher than the rate which can be achieved with a stationary bed combustor of similar overall dimensions.

DESCRIPTION OF THE PREFERRED EMBODIMENTS

Figure 1:
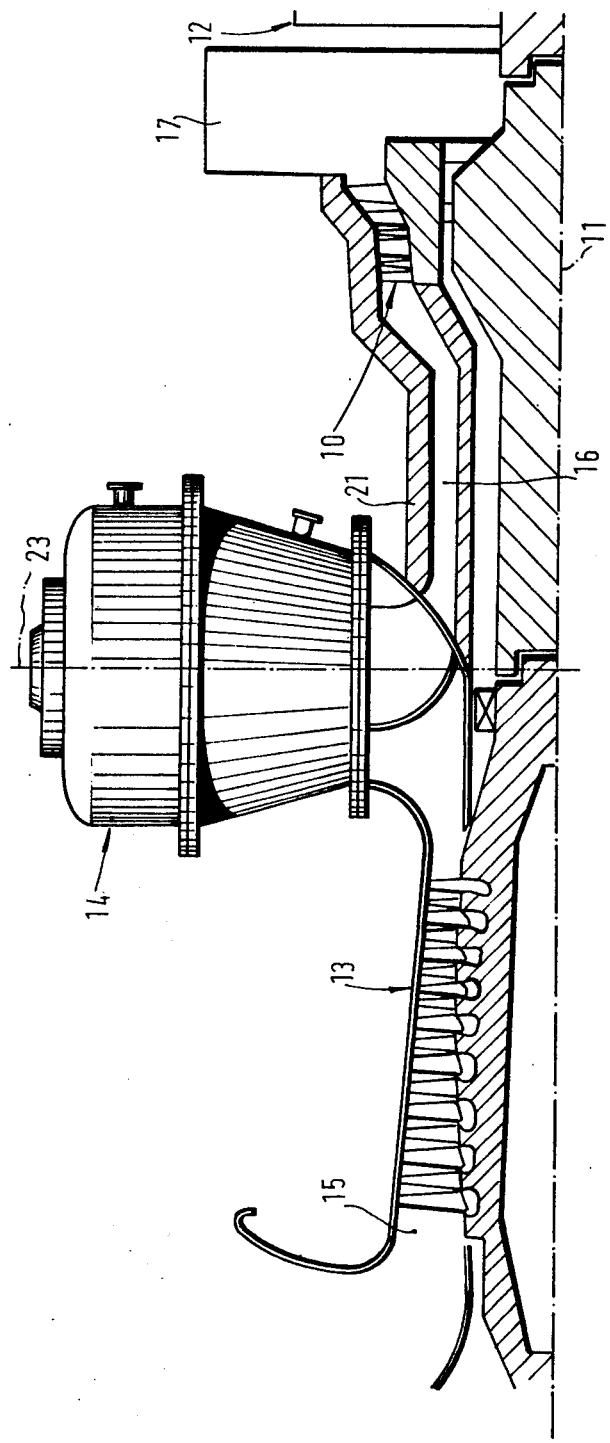
FIG. 1 shows diagrammatically one example of an engine in accordance with the invention, a half cross section only of certain parts being shown.

The engine shown in FIG. 1 comprises a turbine 10 which is mounted for rotation about a horizontal axis 11 and is drivingly associated with an electrical generator 12 which can be driven by the turbine. A compressor 13 is mounted co-axially with the turbine 10 and is also arranged to be driven thereby. Interposed between the compressor and the turbine there is a combustor 14 in which a fuel is burned to produce hot gaseous products of combustion which drive the turbine. The compressor is arranged to draw air from the atmosphere through an inlet duct 15, to compress the air to a predetermined pressure and to feed the compressed air to the combustor 14. The turbine 10 is situated in a power duct 16 which leads from the combustor to an exhaust duct 17, from which the products of combustion may be discharged to the atmosphere. If required, there may be interposed between the combustor 14 and the power duct 16 means for separating from the hot gases particles of solid matter entrained therein.

The combustor 14 includes a casing 20 which is mounted on a body 21 containing the turbine 10, a compressor 13, inlet duct 15 and a power duct 16. Within the casing 20 a rotatable drum 22 is mounted for rotation about a vertical axis 23. The drum is supported from the casing by means of bearings indicated diagrammatically at 24, the bearings being situated at the upper end of the drum so that the drum is suspended from the upper end of the casing.

The drum comprises an upper end wall 25, which is of annular form, and a circumferentially extending cylindrical wall 27 which depends from the periphery of the upper end wall. Below the cylindrical wall 27, there is a conical wall 28 which tapers downwardly and radially-inwardly towards the axis 23. From the lower edge of the conical wall 28 there extends upwardly to a position within the drum and somewhat above the lower extremity of the cylindrical wall 27 an upwardly-divergent wall 29.

The wall 29 is spaced from the axis 23 by a distance which, in the example shown, is equal to at least one half the diameter of the drum 22 but may in other embodiments of the invention be less than one half the drum diameter. This wall defines a central gas outlet 30 of the drum. The cylindrical wall 27 is perforated so that air can enter the drum 22 through the cylindrical wall from an annular inlet space 31 defined between the casing 20 and the cylindrical wall 27 of the drum. The perforations are sufficiently small to enable the wall to support on its internal face a bed of solid particles, such particles being, for example, of the kind which result from the combustion of coal at a temperature within the range 800° to 900° C.

Below the drum 22, the interior of the casing 20 is divided by a stationary wall structure 32 into an entry duct 33 and an exit duct 34. The entry duct 33 communicates with the inlet duct 15 containing the compressor 13 and also with the inlet space 31. The exit duct 34 communicates with the gas outlet 30 and with the power duct 16 containing the turbine 10. Between the wall structure 32 and the drum 22 there is a gas seal 35 which may be of the labyrinth type. Some leakage through this seal can be tolerated without a significant detrimental effect on the performance of the engine.

A stationary delivery means 37 extends into the drum 22 through the central opening of the upper end wall 25. A further gas seal is provided between the delivery means and this end wall. The delivery means is a pneumatic conveyor and is adapted to deliver a solid fuel, for example crushed coal, into the drum at a predetermined rate. When the combustor is in use, the drum 22 and gases therein rotate. Accordingly, solid matter which is fed into the drum by the delivery means tends to be moved away from the axis 23 by centrifugal action. If required, the delivery means may include a discharge portion which extends within the drum towards the cylindrical wall 27 to discharge incoming solid matter at a position near to the cylindrical wall.

Figure 2:
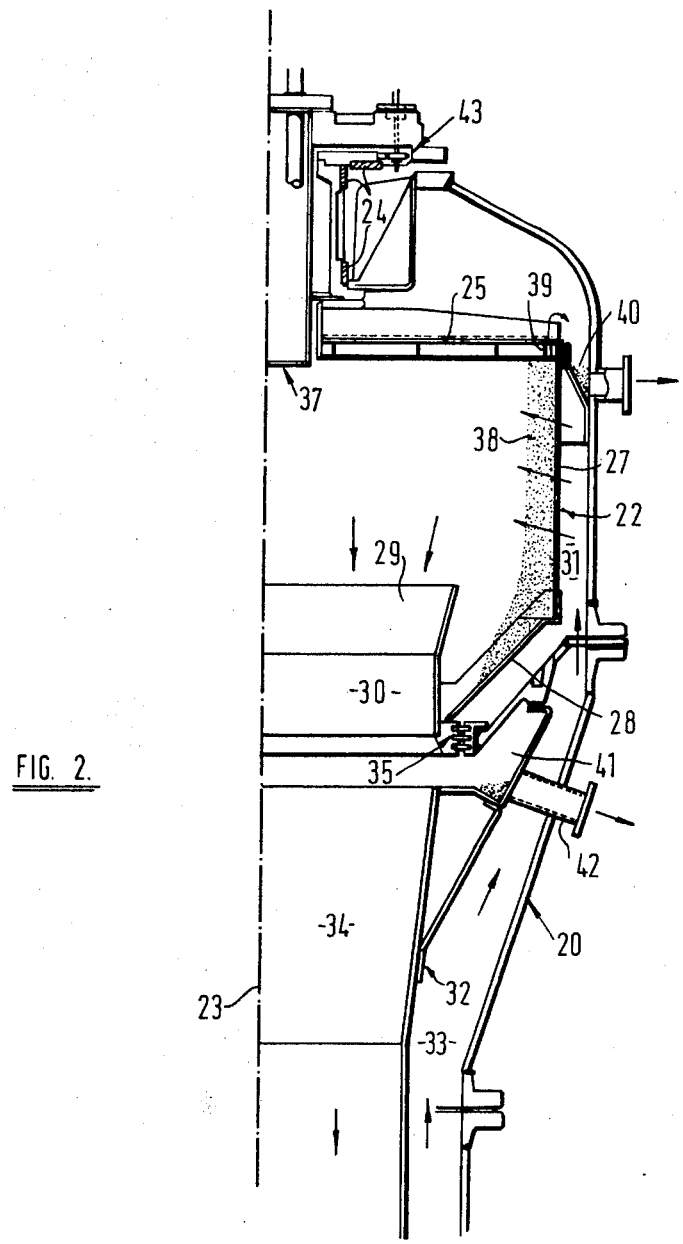
FIG. 2 shows diagrammatically and on a larger scale a combustor of the engine of FIG. 1.

The drum 22 contains a bed 38 of solid particles which, when the drum is rotated, is supported on the internal face of the cylindrical wall 27 as shown in FIG. 2. When the drum is stationary, the particles fall into the annular receiver defined between the conical wall 28 and the upwardly divergent wall 29. When the combustor is first brought into operation, the bed 38 may consist of sand or other refractory material. Subsequently, the composition of the bed may change so that it eventually consists only of ash produced by combustion of the coal fuel. If required, solid particles of refractory material may be fed into the drum concurrently with the delivery of coal thereto.

There is formed in the upper end wall 25 of the drum a solids outlet 39 through which particles of solid material are discharged continuously from the bed 38 during operation. The outlet 39 is situated close to the cylindrical wall 27 so that it communicates with the bed 38, not with the space situated radially-inwardly of the bed during operation. Particles which emerge from the drum through the solids outlet 39 are thrown by centrifugal action radially-outwardly against the casing 20 and fall into a channel 40 from which they are removed continuously.

Immediately below the gas seal 35 there is a further channel 41, the open mouth of which faces radially-inwardly towards the axis 23. The exhaust gases which pass through the gas outlet 30 are rotating at high speed about the axis 23. Any solid particles which are entrained in these exhaust gases tend to move radially-outwardly and are received in the channel 41, from which they are removed continuously or periodically through a pipe 42.

For rotating the drum 22 there is provided drive means including a chain and sprocket or gear train drive 43 situated at the upper end of the casing 20. This drive transmits torque from any convenient form of motor (not shown), or from a shaft driven by the turbine 10 to the drum. The motor or drive means is adapted to vary the speed of the drum.

When the engine is brought into operation, the drum 22 is rotated at a relatively low speed, for example a speed just sufficiently high to cause the bed material to spread over the entire height of the cylindrical wall 27. A gaseous fuel is then injected into air which is fed into the entry duct 33 and the gaseous mixture is ignited within the drum 22 so that the temperature of the bed 38 is raised and combustion is eventually established in the bed. During this initial stage of operation, the speed at which the gases are fed through the bed is sufficient to fluidise the bed but is less than the flame speed which, in a mixture of natural gas and air, is about 1½ feet per second.

When the temperature of the bed has risen to approximately 550°, the delivery of solid fuel through the delivery means 37 is commenced. Once sustained combustion of the solid fuel in the bed has been established, the speed of rotation of the drum and the rate of supply of air are both increased to the normal operating values. The supply of gaseous fuel would be terminated. Typical normal operating conditions are a bed temperature within the range 800° to 900° C., speed of rotation of drum 108 r.p.m., gas velocity through bed 20 feet per second and a pressure drop through the combustor of 3.6 p.s.i.g.

The diameter of the drum 22 shown in FIG. 2 is 5 feet, its height being 1 foot 10 inches. With these dimensions, a speed of 108 r.p.m. gives a force of 10 g at the internal face of the cylindrical wall 27. The depth of the fluidised bed is approximately 3 inches. Coal may be supplied to the bed at a rate of 9616 pounds per hour, the air/fuel ratio being 41.2:1 by weight to give 308 percent excess air. Typically, the total thermal input would be 33.85 mw. and it is anticipated that the nominal output of the generator 12 would be 6 mw.

The air supplied to the combustor 14 from the compressor 13 is at a pressure ten times that of the ambient atmosphere. Accordingly, the casing 22 is internally pressurised and suitable valves are provided in the delivery means 37 to prevent egress of gases whilst coal fuel is being fed into the drum 22.

It is anticipated that, on starting from cold, normal operating conditions can be achieved within approximately 6 minutes. Since the combustion is carried out at a temperature within the range 800° to 900° C. and the ash is not heated to a higher temperature, the ash is relatively soft, as compared with ash which is produced by combustion at a temperature of 1,400° to 1,500° C. The relatively soft ash produced in the combustor shown is less detrimental to the turbine blades than is ash which has been heated to a higher temperature.

Figure 3:
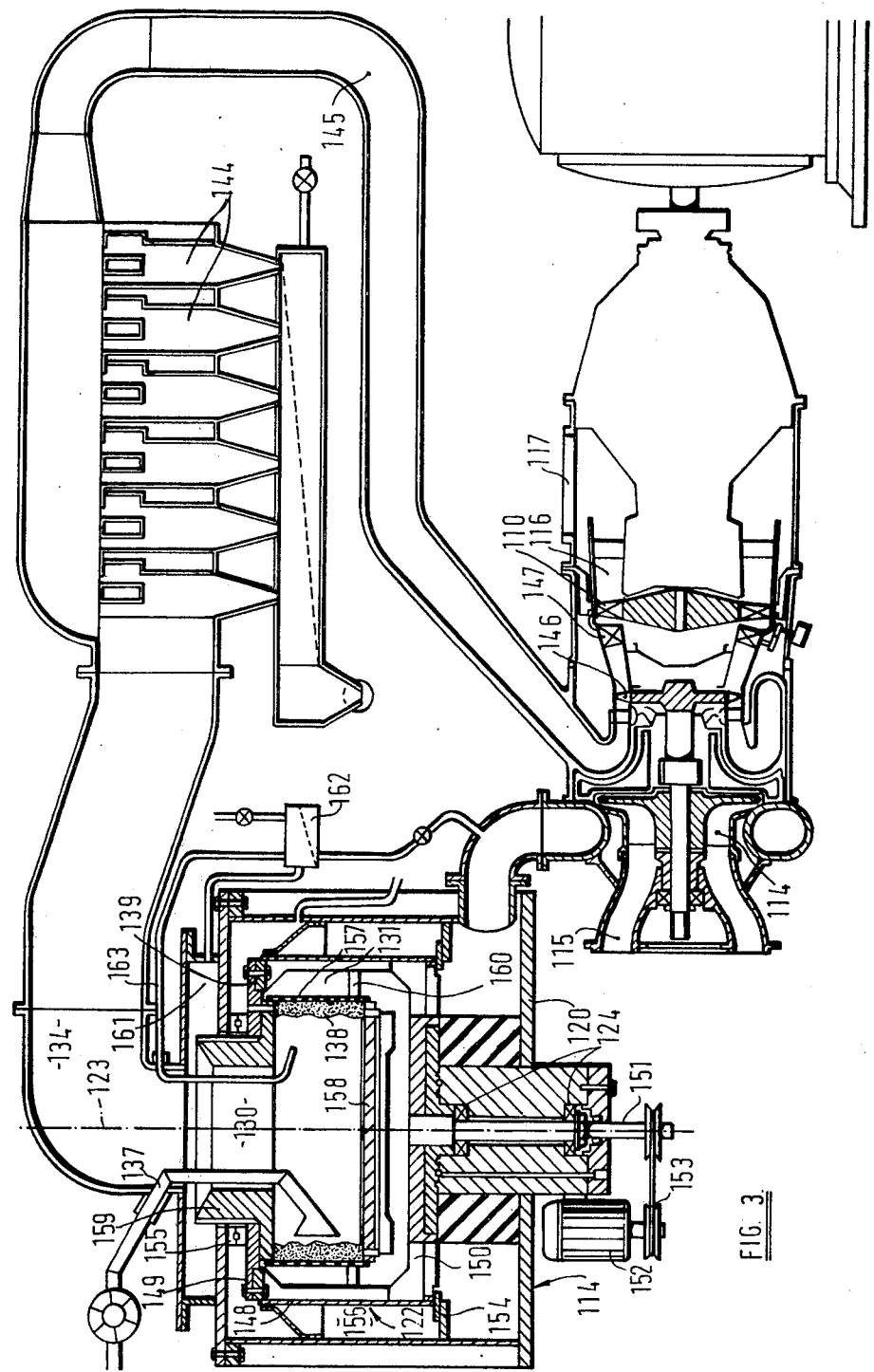
FIG. 3 is an illustration similar to FIG. 1 of a further example of an engine in accordance with the invention.

In FIG. 3 there is shown a further engine, certain parts of which correspond to parts already described with reference to FIGS. 1 and 2. In FIG. 3, such corresponding parts are indicated by like reference numerals with the prefix 1 and the preceding description is deemed to apply except for the difference hereinafter mentioned.

The main difference between the engine of FIG. 1 and the engine of FIG. 3 is that, in the latter, there is interposed between the exit duct 134 of the combustor 114 and the power duct 116 means for removing from the hot gaseous products of combustion any solid particles which are entrained therein. This means comprises a bank of cyclones 144. Each cyclone has a tangential inlet which communicates with the exit duct 134 and an axial gas outlet which leads to a duct 145 which conveys the gaseous products of combustion to the power duct 116. Solid particles which are separated from the gas stream by the cyclones are discarded.

The cyclones 144 may be formed of a ceramic material, in which case the entire bank of cyclones is preferably contained within a housing (not shown), the interior of which can be pressurised to avoid any large pressure differential between the interior and exterior of the cyclones.

The compressor is driven by a first turbine 146 in the power duct 16. Downstream of the turbine 146 there is provided a set of adjustable stator blades 147 which can be adjusted from a normal position to a braking position where they deflect the gas stream in such a manner as to cause a braking effect on the main power turbine 110. Control means is provided for moving the adjustable stator blades to their braking positions whenever the speed of the main turbine 110 reaches a threshold value. The adjustable stator blades thus constitute a safety device which prevents the turbine being driven at an excessively high speed.

The rotatable drum 122 of the combustor shown in FIG. 3 comprises an outer, imperforate cylindrical wall 148 which is secured to an annular upper end wall 150. At its upper end, the wall 148 is secured to a lower end wall 150 formed with apertures to admit to the drum air which is received from the compressor 114. The end wall 150 is rigidly secured to a shaft 151 supported by the bearings 124 so that the walls 148, 149 and 150 form a rigid structure which is supported by the bearings. For driving the drum 122, there is provided a variable speed motor 152 which is connected with the shaft 151 by a belt and pulley drive 153.

There is between the rotatable drum 122 and the stationary casing 120 first and second seals 154 and 155 respectively. The seal 154 is situated between the end wall 150 and the casing and the seal 155 is situated between the end wall 149 and the casing. The seals 154 and 155 are of the labyrinth type and, in order to reduce or eliminate leakage of gas through the seals into the space 156 defined between the casing and the rotatable drum, this space is pressurised.

The rotatable drum 122 further comprises an inner circumferentially extending wall 157 which is spaced radially inwardly from the wall 148. The cylindrical space inside the wall 157 constitutes a combustion chamber and contains a bed 138 of particles. The end of the combustion chamber adjacent to the shaft 151 is closed by a circular plate 158 secured to the wall 157. The opposite end of the combustion chamber is partly closed by an annular member 159 which defines a central gas outlet 130 of the combustor. The plate 158 and the member 159 are imperforate, so that air for combustion can enter the combustion chamber only through the perforate wall 157. The member 159 is secured to the end wall 149 of the rotatable drum. A plurality of spacers 160 is provided in the annular inlet space 131 between the walls 148 and 157. These spacers prevent any substantial departure from a concentric relation between the inner and outer parts of the drum but are secured to only one of these.

In the member 159 and the end wall 149 of the rotatable drum, there is formed a solids outlet opening 139 through which particles of solid material are discharged from the bed 38 during operation. Adjacent to and extending radially outwardly from the free end of the member 159, there is provided a stationary trap for receiving solid particles which are carried through the gas outlet 130. Since the gas stream in the outlet 130 is rotating rapidly about the axis 123, such particles tend to be thrown radially outwardly from the gas stream into the trap 161. From the trap, the particles pass through a pipe into a housing 162 where the particles are fluidised by air supplied from the compressor 114 and blown through a return pipe 163 into the combustion chamber.

The engine shown in FIG. 3 is brought into operation in the same manner as hereinbefore described with reference to the engine shown in FIGS. 1 and 2.

There may be associated with the turbine 10 of FIG. 1 adjustable stator blades similar to the blades 147 described with reference to FIG. 3. This would enable driving of the turbine 10 at an excessively high speed to be avoided.

The fuel delivery means 37 shown in FIG. 2 and the fuel delivery means 137 shown in FIG. 3 are adapted to deliver powdered solid fuel into the drum. Alternatively, the fuel delivery means may be adapted to deliver a slurry, for example a slurry comprising solid, combustible particles suspended in a liquid which may be combustible or noncombustible. The fuel delivery means may also be adapted to deliver viscous liquids or partially solid materials such as refinery tailings.

I claim:

1. An engine comprising: a turbine in a power duct; a drum having a circumferentially extending wall which is permeable to gases, a gas outlet remote from the circumferentially extending wall and communicating with the power duct and a solids outlet adjacent to the circumferentially extending wall; a casing in which the drum is contained; means for supporting the drum for rotation relative to the casing and rotating the drum about a substantially vertical axis; a bed of particles which is supported in the drum at least during operation of the engine; means for feeding air into the drum through the circumferentially extending wall to fluidise the bed of particles; and means for delivering a fuel comprising solid fuel particles into the drum; whereby fuel burns in the bed of particles, the hot products of combustion pass through the gas outlet to the power duct to drive the turbine and excess particles are discharged from the bed through the solids outlet.

2. An engine according to claim 1 wherein the drum is arranged with one end above the other and the delivery means extends into the drum through the upper end thereof.

3. An engine according to claim 1 wherein the casing is adapted to be pressurised.

4. An engine according to claim 1 further comprising variable speed drive means for rotating the drum relative to the casing at a selected speed.

5. An engine according to claim 1, wherein the means for delivering fuel extends into the drum and includes a discharge portion from which fuel is discharged onto a surface of the bed exposed within the drum, said discharge portion being disposed radially inwardly of the bed.

6. An engine according to claim 1, wherein the the drum has an upper end wall partly closing an upper end of the drum, the solids outlet is formed in said upper end wall and the casing includes a channel disposed adjacent to and radially outwardly of said upper end wall for receiving solids which leave the drum through the solids outlet.

* * * * *